United States Patent [19]
Jesswein et al.

[11] 3,854,542
[45] Dec. 17, 1974

[54] MODULAR VEHICLE COUPLING

[75] Inventors: Ronald M. Jesswein, Berrien Springs; Richard R. Hushower, Buchanan; Ralph M. Duttarer, Saint Joseph, all of Mich.

[73] Assignee: Clark Equipment Company, Buchanan, Mich.

[22] Filed: May 20, 1974

[21] Appl. No.: 471,379

[52] U.S. Cl............... 180/12, 180/51, 280/479 R
[51] Int. Cl............................................. B60d 7/00
[58] Field of Search.......... 180/121 AR; 280/479 R, 280/479 A, 477

[56] References Cited
UNITED STATES PATENTS

| | | |
|---|---|---|
| 3,074,501 | 1/1963 | Lane et al. ........................ 180/14 R |
| 3,285,625 | 11/1968 | Krueger .......................... 280/479 R |
| 3,306,630 | 2/1967 | Weiste ............................ 280/479 R |
| 3,379,457 | 4/1968 | Restall et al. ................... 280/479 R |
| 3,432,184 | 3/1969 | Tweedy........................... 280/479 R |
| 3,478,833 | 11/1969 | Breon et al. ........................... 180/12 |
| 3,563,329 | 2/1971 | Licari................................... 180/12 |

*Primary Examiner*—Leo Friaglia
*Attorney, Agent, or Firm*—Kenneth C. Witt

[57] ABSTRACT

In a vehicle which is separable into a tractor module and an implement module there are two detachably connectable coupling plates, one on each module. The coupling plate on the tractor module is shaped to cooperate with projecting members on the other coupling plate to facilitate movement and adjustment of both coupling plates and their respective modules into position so that they may be secured together.

4 Claims, 3 Drawing Figures

PATENTED DEC 17 1974　　　　　　　　　　　　3,854,542

MODULAR VEHICLE COUPLING

BACKGROUND OF THE INVENTION

1. Field of the Invention

This invention relates to modular vehicles comprising a tractor module and an implement module which can be readily connected together and disconnected. By utilizing different implement modules with the same tractor module it is possible to form a variety of different types of vehicles.

2. Description of Prior Art

U.S. Pat. No. 3,563,329 Licari, dated Feb. 6, 1971, is illustrative of the type of vehicle mentioned. The said patent discloses a vehicle comprising a two wheel tractor module which includes a pivotable connection portion. There are auxiliary wheels on the connection portion to make it possible to move the two wheel tractor module under its own power when it is not coupled to an implement module.

The object of the present invention is to provide a coupling arrangement for facilitating alignment of the tractor module with an implement module and the subsequent coupling together of the two modules to form a complete vehicle.

SUMMARY OF THE INVENTION

In carrying out this invention in one preferred form we provide a first coupling plate forming a portion of the tractor module and a second coupling plate forming a portion of the implement module, with the two coupling plates being in confronting position when in coupling relation. The coupling plate on the tractor module has a horizontally disposed upper edge and sloping side guide edges. The coupling plate on the implement module has brackets arranged thereon to be engaged by the mentioned edges during an alignment and coupling maneuver. The configuration of the brackets is such as to provide for various kinds of movement in order properly to align the two coupling plates so that they may be secured together.

DESCRIPTION OF PREFERRED EMBODIMENT

Figure 1:
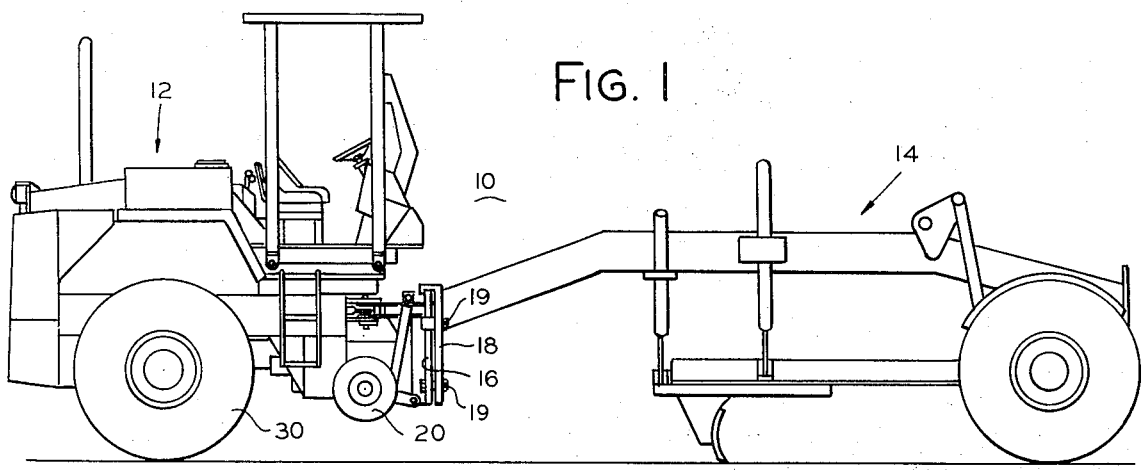
FIG. 1 is a schematic side elevational view showing a complete articulated vehicle which includes a tractor module coupled to an implement module.

Referring to FIG. 1 of the drawing there is shown a complete articulated vehicle which is indicated generally by the numeral 10 and is composed of two separable parts, a tractor module indicated by the numeral 12 and an implement module indicated by the numeral 14. The implement module illustrated is a grader implement which when coupled to the tractor module as shown makes a complete motor grader vehicle for the movement of dirt or other material by scraping and pushing.

Figure 2:
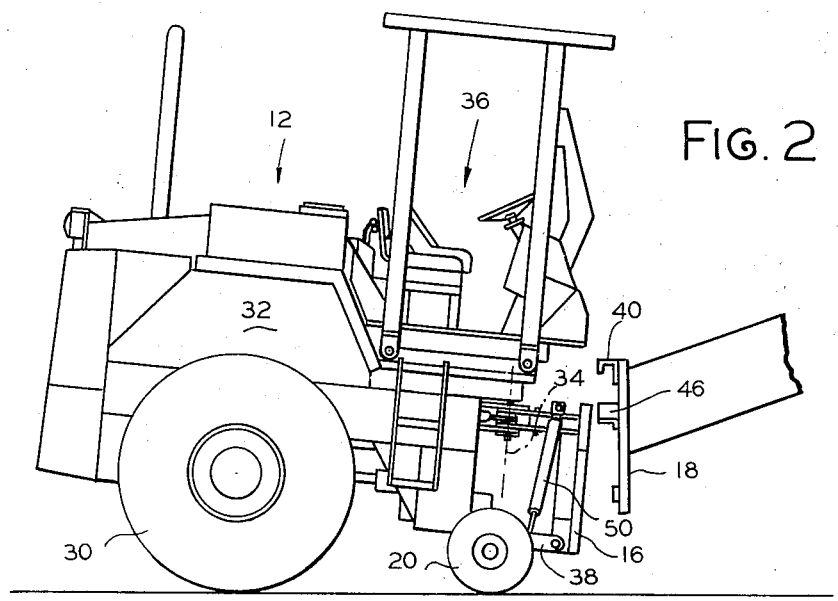
FIG. 2 shows the tractor module and a portion of the implement module disconnected from each other but in condition ready to be connected together.

The tractor module 12 and the implement module 14 are detachably secured together in a suitable manner such as by means of bolts 19 through the coupling plate 16 on the tractor module and coupling plate 18 on the implement module. FIG. 2 shows the tractor module detached from the implement module, and when thus detached the tractor module is supported on auxiliary wheels 20. The auxiliary wheels 20 are utilized to maneuver the tractor module for connection to the implement module and after such connection has been accomplished the auxiliary wheels 20 are retracted as illustrated in FIG. 1. For more information on the manner in which the auxiliary wheels are utilized reference can be had to the aforesaid U.S. patent.

Figure 3:
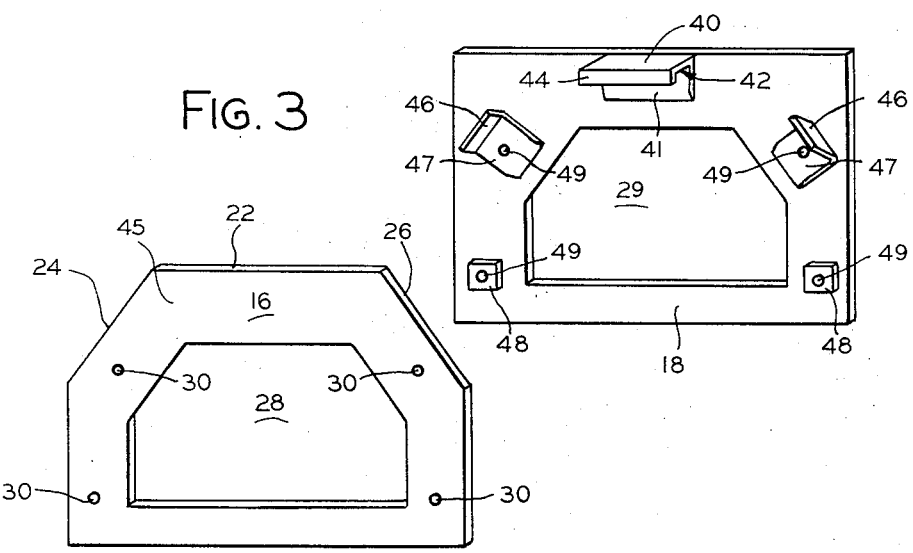
FIG. 3 is a perspective view of the coupling plates and brackets on one of them.

FIG. 3 of the drawing shows the coupling plates on an enlarged scale and separate from their respective modules. Coupling plate 16 of the tractor module includes a horizontally disposed upper edge 22, and on either side of this upper edge are sloping edges which are indicated respectively by the numerals 24 and 26. While the edges 22, 24 and 26 are shown in trapezoidal configuration it will be appreciated that other arrangements may be utilized within the scope of the present invention. Coupling plate 16 also includes a central opening 28 which may be utilized for the location of a drive shaft for the mechanical drive of the wheels on the implement unit if four wheel drive is desired although the vehicle described and illustrated herein has only two wheel drive, which is by the wheels 30 (only one of which is visible) on the tractor module 12.

Coupling plate 16 includes provision for securing it to coupling plate 18 and as illustrated these are bolt holes 30. It will be appreciated that coupling plate 16 is pivotably connected to the main body portion 32 of the tractor module to pivot about a vertically disposed axis 34 under control of the operator. Thus, when tractor module 12 is disconnected from an implement module and is supported on its main drive wheels 30 and auxiliary wheels 20, the operator can maneuver the tractor module by pivoting the front connection portion of the tractor module including coupling plate 16 from side to side in order to steer the tractor module as it is propelled by an engine and drive line of known type which are embodied in tractor module 12, and maneuver the coupling plate 16 relative to coupling plate 18.

To accommodate the vehicle to uneven terrain the auxiliary wheels 20, one on each side of the tractor module, may be raised and lowered individually by the operator located at the operator's station 36. Each of the auxiliary wheels 20, only one of which is visible on the drawing, is mounted on a pivotal arm 38 and may be raised and lowered by remote control of the operator by means of a hydraulic actuator 50. The two actuators 50 for the wheels 20 can be raised and lowered individually to adjust to uneven terrain, and as is explained further hereinafter, after contact has been made by the upper surface 22 of the coupling plate 16 with the mating coupling plate both auxiliary wheels can be pivoted together without changing the attitude to raise the coupling plate 16 to get the two coupling plates and their respective modules into coupling relation.

Coupling plate 18 on the implement module includes upper bracket 40 which projects outwardly from the front face of coupling plate 18 and the undersurface 42 of bracket 40 is contacted by the upper edge 22 of coupling plate 16 as the latter moves upwardly adjacent coupling plate 18 to get the two coupling plates into coupling relation, that is, into a confronting position in which they may be bolted or otherwise secured together. Bracket 40 also includes a downwardly projecting portion 44 which projects down behind the back surface 45 of coupling plate 16 when the two coupling plates are in coupling relation.

Coupling plate 16 fits into the downwardly facing channel formed by bracket 40 of which undersurface 42 is the bight portion, with small clearance, that is, small clearance fore and aft. This construction makes it possible for the operator of the tractor module who is maneuvering the tractor module to get into position to couple it to the implement module to drive the tractor module either forwardly or rearwardly and move the implement module along with it during alignment operation; during forward movement the portion of coupling plate 16 adjacent edge 22 abuts the portion 41 of bracket 40 and pushes the coupling plate 18 and the implement module forwardly, while during rearward movement the portion of coupling plate 16 adjacent edge 22 abuts portion 44 of the bracket 40 and moves the coupling plate 18 and module 14 the other way. Such maneuvering is to overcome difficulties presented by uneven terrain, by getting the two modules on sufficiently level terrain or otherwise aligned so that they can be connected together.

Coupling plate 18 also has outwardly projecting brackets 46 secured thereto in locations where they are contacted by the sloping edges 24 and 26 of coupling plate 16 as the coupling plate 16 is raised upwardly relative to coupling plate 18 to get them into coupling relation so that they may be bolted together. As shown, a pair of pads or spacers 48 are secured to the same surface of coupling 18 as brackets 40 and 46 to provide abutments which are in the same plane as the vertically disposed surfaces 41 and 47 of the brackets, to provide in effect a planar surface on coupling plate 18 against which coupling plate 16 abuts. As shown, there are bolt holes 49 through brackets 46 and through spacers 48 which are in alignment with bolt holes 30 when the two coupling plates are in coupling relation. Coupling plate 18 also has an opening 29 which aligns with opening 28 in plate 16.

It will be appreciated from the foregoing that with the implement module 14 resting on the ground with its coupling plate 18 in the position illustrated in FIG. 2, for example, that it is possible readily for the operator to maneuver tractor module 12 from approximately the position shown in FIG. 2, forwardly, while at the same time raising coupling plate 16 upwardly by extending auxiliary wheels 20. Depending on the terrain, upper edge 22 and one or more of edges 24 and 26 will engage the brackets 40 and 46 respectively. The auxiliary wheels 20 can be moved upwardly or downwardly, individually or together to raise or lower one side or other of the coupling plate 16 or raise or lower the entire coupling plate, it being understood that the axle on which wheels 30 are mounted may be pivoted about a longitudinal axis, as explained in the said patent, to permit pivoting of the tractor module about a longitudinal axis. In addition, tractor module 12 can be maneuvered forwardly and rearwardly to help in aligning the two coupling plates, by virtue of the portion of coupling plate 16 adjacent surface 22 which abuts either the forward or rearward portion of bracket 40 in order that the two modules can be moved forwardly or rearwardly, as explained.

While we have described and illustrated herein the best mode now contemplated for carrying out our invention, it will be appreciated that modifications may be made. Accordingly, we intend to cover by the appended claims all such modifications which fall within the true spirit and scope of our invention.

We claim:

1. In a modular vehicle which is separable into a tractor module and an implement module the combination comprising, a first coupling plate forming a portion of the tractor module, a second coupling plate forming a portion of the implement module and detachably connectible to the said first coupling plate, the two coupling plates being in confronting position when in coupling relation, the said first coupling plate having a transverse horizontally disposed upper edge and a pair of sloping guide edges adjacent the respective ends of the said upper edge, an upper bracket secured to the said second coupling plate and extending over the said first coupling plate in contact with the said upper edge when the coupling plates are in coupling relation, the said upper bracket having a downwardly projecting portion adjacent the back surface of the said first coupling plate whereby during a coupling operation movement of the said first coupling plate either forwardly or rearwardly produces movement of the said second coupling plate in the same direction, and a pair of guide brackets secured to the said second coupling plate and located where they are contacted by the said sloping edges on the first coupling plate when the first coupling plate is raised upwardly to bring the said upper edge on the first coupling plate in contact with the said upper bracket on the second coupling plate.

2. The combination as specified in claim 1 in which the tractor module includes means for selectively raising and lowering either side of the said first coupling plate separately and for raising the entire plate without changing the attitude thereof.

3. The combination as specified in claim 1 in which the tractor module includes means for pivoting the said first coupling plate back and forth laterally about a vertically disposed axis.

4. The combination as specified in claim 2 in which the tractor module includes means for pivoting the said first coupling plate back and forth laterally about a vertically disposed axis.

* * * * *